(12) United States Patent
Davis

(10) Patent No.: US 9,298,602 B2
(45) Date of Patent: Mar. 29, 2016

(54) NONVOLATILE RANDOM ACCESS MEMORY USE

(71) Applicant: LENOVO (Singapore) PTE, LTD., New Tech Park (SG)

(72) Inventor: Mark Charles Davis, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 133 days.

(21) Appl. No.: 14/092,444

(22) Filed: Nov. 27, 2013

(65) Prior Publication Data
US 2015/0149715 A1 May 28, 2015

(51) Int. Cl.
*G06F 12/02* (2006.01)

(52) U.S. Cl.
CPC .................................. *G06F 12/0238* (2013.01)

(58) Field of Classification Search
None
See application file for complete search history.

(56) References Cited

U.S. PATENT DOCUMENTS

| | | |
|---|---|---|
| 5,630,090 A | 5/1997 | Keehn et al. |
| 6,711,093 B1 | 3/2004 | Shore et al. |
| 7,020,040 B2 | 3/2006 | Lin |
| 8,068,373 B1 | 11/2011 | Totolos, Jr. et al. |
| 8,145,833 B1 * | 3/2012 | Duan ............................ 711/104 |
| 2003/0033472 A1 | 2/2003 | Yano |
| 2003/0084235 A1 | 5/2003 | Mizuki |
| 2006/0085293 A1 | 4/2006 | Melucci |
| 2006/0104141 A1 | 5/2006 | Jo |
| 2006/0198225 A1 | 9/2006 | Spengler |
| 2008/0195806 A1 | 8/2008 | Cope |
| 2008/0209117 A1 * | 8/2008 | Kajigaya ....................... 711/104 |
| 2009/0187689 A1 | 7/2009 | Roohparvar |
| 2010/0202240 A1 | 8/2010 | Moshayedi et al. |
| 2011/0055671 A1 | 3/2011 | Kim et al. |
| 2011/0194358 A1 | 8/2011 | Choi |
| 2011/0299352 A1 | 12/2011 | Fujishiro et al. |
| 2013/0031388 A1 | 1/2013 | Sakarda |
| 2014/0013034 A1 * | 1/2014 | Kwon et al. .................. 711/103 |
| 2014/0189198 A1 * | 7/2014 | Siddiqi et al. ................ 711/103 |
| 2014/0226400 A1 | 8/2014 | Kimura |
| 2014/0281736 A1 | 9/2014 | Kong |
| 2014/0293691 A1 | 10/2014 | Arakawa et al. |

OTHER PUBLICATIONS

U.S. Appl. No. 14/156,245, Office Action Summary, Mar. 6, 2015.
U.S. Appl. No. 14/156,245, Office Action Summary, Sep. 16, 2015.
14156245, Notice of Allowance and Fee(s) Due, Feb. 4, 2016.

* cited by examiner

*Primary Examiner* — Gary Portka
(74) *Attorney, Agent, or Firm* — Kunzler Law Group

(57) ABSTRACT

For nonvolatile random access memory (NVRAM) use, a query module identifies persistent data on a NVRAM in response to waking the NVRAM. A management module makes available the persistent data for use.

20 Claims, 7 Drawing Sheets

200

| Data ID 205 | Storage Address 210 | Data Pedigree 215 |
|---|---|---|
| Data ID 205 | Storage Address 210 | Data Pedigree 215 |
| Data ID 205 | Storage Address 210 | Data Pedigree 215 |
| Data ID 205 | Storage Address 210 | Data Pedigree 215 |

220 (for each row)

| Data Element Source 225 |
|---|
| Update Status 230 |
| Current Status 235 |
| Uses per Interval 240 |
| Persistence Settings 245 |
| Last Access 250 |
| Validation Signature 255 |

FIG. 2B

NONVOLATILE RANDOM ACCESS MEMORY USE

CROSS-REFERENCE TO RELATED APPLICATIONS

Field

The subject matter disclosed herein relates to nonvolatile random access memory (NVRAM) and more particularly relates to NVRAM use.

BACKGROUND

Description of the Related Art

High-speed NVRAM may be employed in a computing device alone and with dynamic random access memory (DRAM).

BRIEF SUMMARY

An apparatus for NVRAM use is disclosed. The apparatus includes a processor, a memory storing code executable by the processor, a query module, and a management module. The query module identifies persistent data on a NVRAM in response to waking the NVRAM. The management module makes available the persistent data for use. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A is a schematic block diagram illustrating one embodiment of a catalog;

FIG. 2B is a schematic block diagram illustrating one embodiment of a data pedigree;

DETAILED DESCRIPTION

Figure 1A:
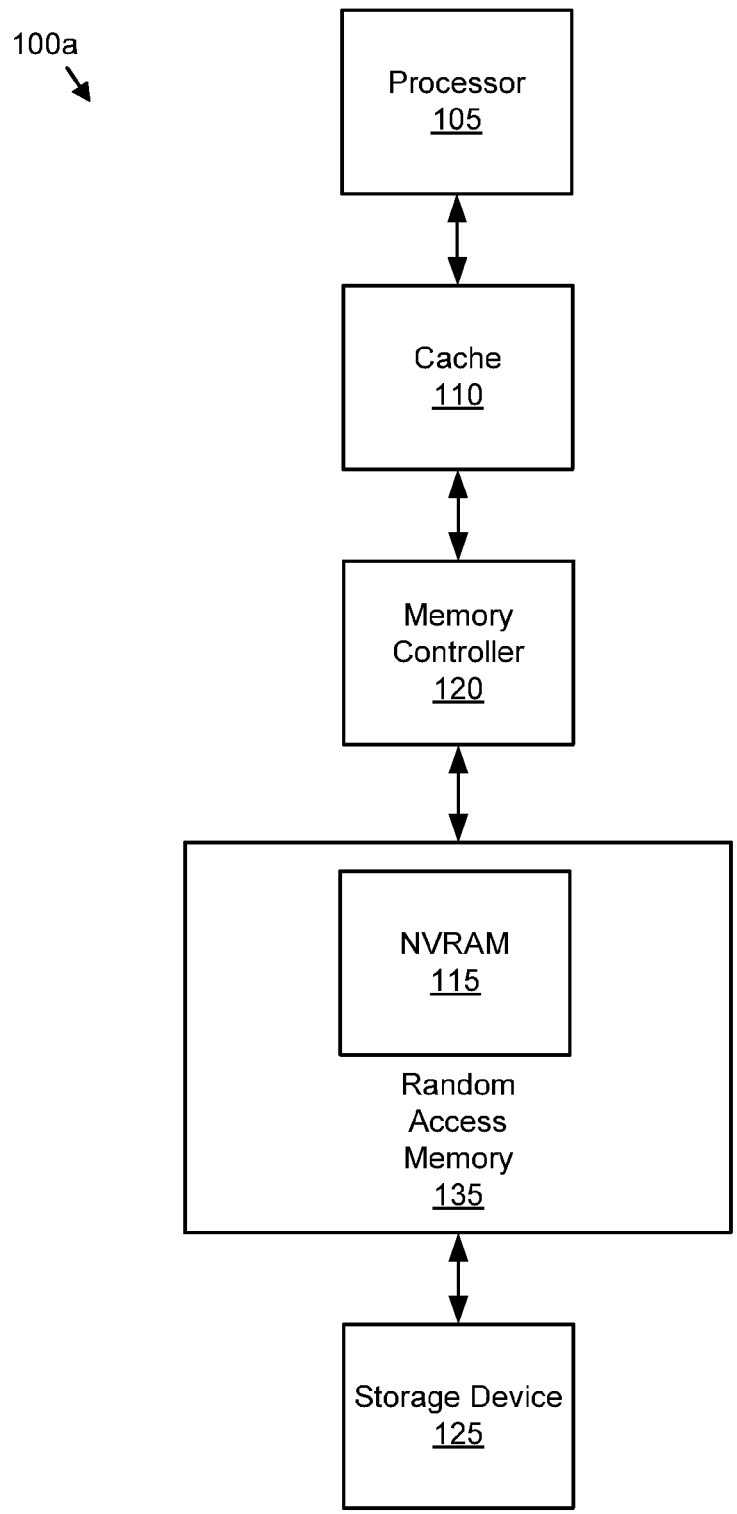
FIG. 1A is a schematic block diagram illustrating one embodiment of a computing device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Descriptions of Figures may refer to elements described in previous Figures, like numbers referring to like elements.

FIG. 1A is a schematic block diagram illustrating one embodiment of a computing device 100*a*. The computing device 100*a* may be a computer workstation, a laptop computer, a tablet computer, a mobile phone, a server, an eyeglass computer, a wearable computer, or the like. The computing device 100*a* includes a processor 105, a cache 110, a memory controller 120, a random-access memory 135, and a storage device 125.

The storage device 125 may be a nonvolatile storage device such as flash memory storage, a hard disk drive, an optical storage device, a micromechanical storage device, or combinations thereof. The storage device 125 may store large quantities of instructions and data, referred to herein as data, for the computing device 100*a*.

When the computing device 100*a* is booted, the processor 105 may request data from the memory controller 120. The memory controller 120 may copy the data from the storage device 125 to the random-access memory 135. Typically, the data that are actively used by the processor 105 are stored in the random-access memory 135. In addition, frequently used data may be migrated to the cache 110. The cache 110 may provide a low-latency storage space that is synchronized with the random-access memory 135 as is well known to those of skill in the art.

In the past, the random-access memory 135 has typically included DRAM. DRAM is inexpensive and fast, making it well suited for providing a large storage space for the processor 105. Unfortunately, DRAM is also volatile. As a result, data that are stored in DRAM do not persist after the computing device 100*a* is powered down or restarted. As a result, processes that are used frequently such as an operating system must be reloaded from the storage device 125 each time the computing device 100*a* is booted.

In the depicted embodiment, NVRAM 115 is employed for the random-access memory 135. The NVRAM 115 may be magnetoresistive random-access memory (MRAM). Because the NVRAM 115 is nonvolatile, data that are stored on the NVRAM 115 persist after the computing device 100*a* is powered down and/or restarted. As a result, data such as operating systems and drivers that in the past have been reloaded from the storage device 125 to the random-access memory 135 after each time the computing device 100*a* is powered down or booted, may be available for use without reloading from the storage device 125.

The embodiments described herein identify persistent data on the NVRAM 115 in response to waking the NVRAM 115. In addition, the embodiments make available the persistent data for use as will be described hereafter. As a result, when a computing device 100*a* is powered on and/or rebooted, much data need not be reloaded from the storage device 125. Therefore, the computing device 100*a* is operational much more rapidly.

Figure 1B:
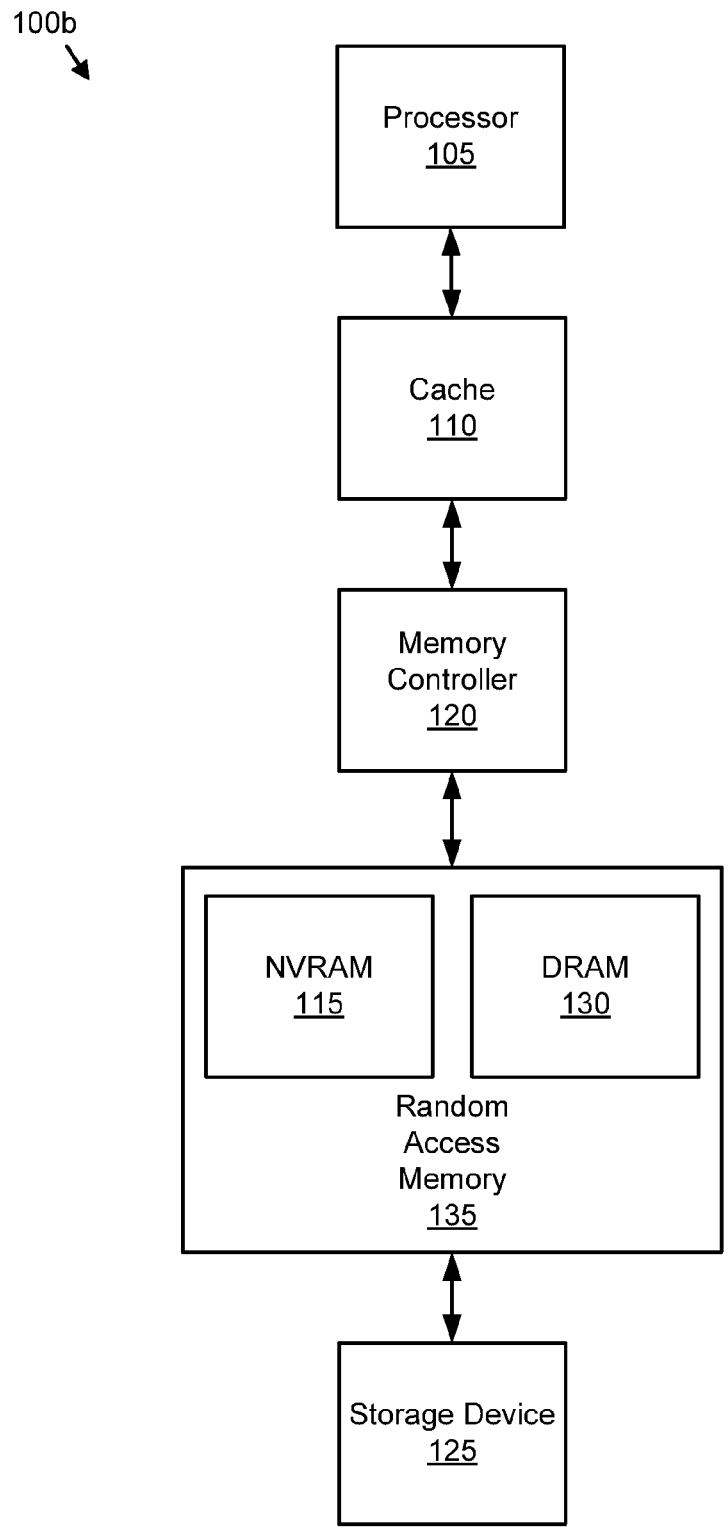
FIG. 1B is a schematic block diagram illustrating one alternate embodiment of a computing device.

FIG. 1B is a schematic block diagram illustrating one alternate embodiment of a computing device 100*b*. The computing device 100*b* is the computing device 100*a* of FIG. 1A. However, the computing device 100*b* is depicted with both NVRAM 100 and DRAM 130 in the random-access memory 135.

A portion of the random-access memory 135, the NVRAM 115, is nonvolatile memory, while another portion of the random-access memory 135, the DRAM 130, is volatile memory. As a result, some of the data stored in the random-access memory will persist while the computing device 100*b* is powered down and/or restarted.

The DRAM 130 may be faster and less expensive than MVRAM 115. For example, the NVRAM 115 may have a performance that is 50 to 100 percent of the performance of the DRAM 130. In addition, the cost of a byte of NVRAM 130 may be 100 to 200 percent the cost of a bite of DRAM 130. As a result, the computing device 100 may include more DRAM 130 than NVRAM 115. The embodiments described herein manage the allocation of storage space in the NVRAM 115 and in the DRAM 130.

FIG. 2A is a schematic block diagram illustrating one embodiment of a catalog 200. The catalog 200 may be stored in the NVRAM 115. In addition, the catalog 200 may identify persistent data that is stored on the NVRAM 115.

In one embodiment, the catalog 200 includes a plurality of entries 220. The catalog 200 may include an entry 220 for each data element in the NVRAM 115. A data element may be a process, an application, a file, the dynamically linked library (DLL), and the like. Each entry 220 may include a data identifier 205, a storage address 210, and a data pedigree 215. In an alternative embodiment, the catalog 200 includes an entry for each data element in the random-access memory 135. In a certain embodiment, the catalog 200 may be incorporated into a file system for the computing device 100.

In one embodiment, the data identifier 205 is a Universally Unique Identifier (UUID) as defined by the Open Software Foundation. The UUID may identify a process, a program, an operating system, or the like.

In one embodiment, the date identifier 205 includes a logical name and/or logical path for a data object stored by file system. For example, the computing device 100 may employ a file system to organize data thereon. The file system may describe each data object in the file system with a logical name and/or logical path that is also used as the data identifier 205.

The storage address 210 may be the address in the NVRAM 115 of the data element for the entry 220. In one embodiment, the storage address 210 is an address range. Alternatively, the storage address 210 may include one or more data blocks storing the data element. In a certain embodiment, the storage address 210 is a random-access memory address that includes DRAM addresses. The data pedigree 215 may record a state and pedigree of the data element as will be described hereafter.

FIG. 2B is a schematic block diagram illustrating one embodiment of the data pedigree 215. In one embodiment, the data pedigree 215 includes a data element source 225, an update status 230, a current status 235, uses per interval 240, persistence settings 245, a last access 250, and a validation signature 255.

The data element source 225 may record a source of the data element. For example, the data element source 225 may be a storage location in the storage device 125. Alternatively, the data element source 225 may be a Universal Resource Locator (URL) for portions of the data element retrieved from a network. In a certain embodiment, the data element source 225 is a logical name and/or logical path to the data element in one or more file systems, or combinations thereof.

The update status 230 may record updates to the data element. In one embodiment, the update status indicates whether updates have been made to the data element that have not been stored to the storage device 125. In addition, the update status 230 may include a version for the data element. For example, an operating system kernel data element may have a version number that is stored in the update status 230.

In one embodiment, the update status 230 includes a modification date. For example, if the data element comprises contact information, the update status 230 may include the modification date when the contact information was last updated.

The current status 235 may record a status of the data element. In one embodiment, the current status 235 may be one of "current" and "not current." In one embodiment, the data element is current if the data element may be employed as is without reloading the data element from the storage device 125.

The uses per interval 240 may record a number of times the data element is used during a specified use interval. The use interval may be unit of time such as a day, week, and/or a month. Alternatively, the use interval may be a logical interval such as a boot cycle.

The persistence settings 245 recommend whether the data element is stored in the NVRAM 115. In one embodiment, the persistence settings 245 are one of always storing the data element in the NVRAM 115, or ALWAYS STORE, storing the data element in the NVRAM 115 if free space in the NVRAM 115 exceeds a free space threshold, or SPACE AVAILABLE, and indicating that storing the data element in the NVRAM 215 is not needed, or NOT NEEDED. For example, an operating system kernel data element may have a persistence setting 245 of ALWAYS STORE.

The last access 250 may record the last use of the data element by the computing device 100. In one embodiment, the last access 250 is recorded only once for each use interval. Alternatively, the last access 250 may be recorded each time the data element is accessed by the computing device 100.

The validation signature 255 may validate the data element as persistent data. The validation signature 255 may be a hash of the data element, a checksum for the data element, or the like. In one embodiment, the validation signature 255 comprises at least 4 bytes.

Figure 3:
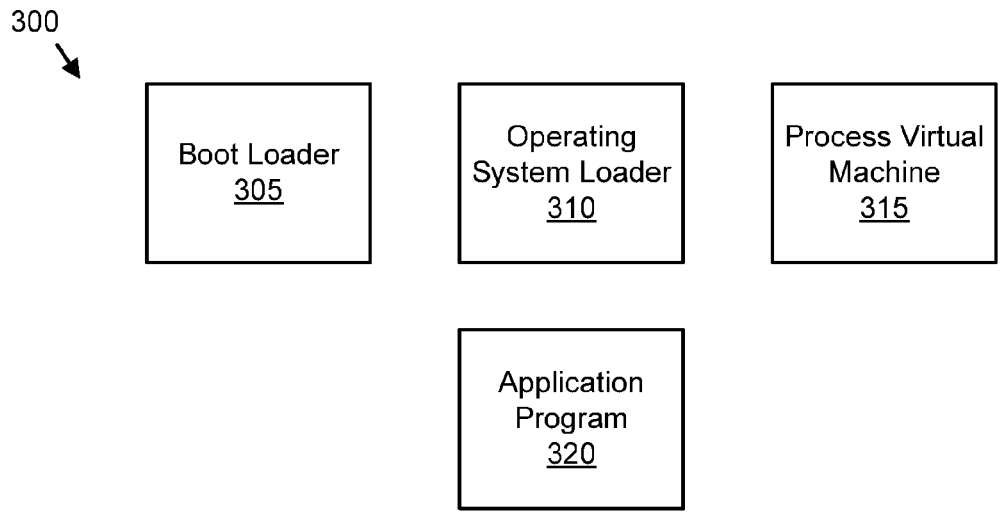
FIG. 3 is a schematic block diagram illustrating one embodiment of data loading processes.

FIG. 3 is a schematic block diagram illustrating one embodiment of data loading processes 300. The processes 300 may include a boot loader 305, an operating system loader 310, a process virtual machine 315, and an application program 320.

Each of the data loading processes 300 may periodically load a data element from the storage device 125 into the random-access memory 135. For example, the boot loader 305 may load a kernel of an operating system during a boot of the computing device 100. The boot loader 305 may be a proprietary boot loader. The operating system may be a WINDOWS® operating system, an ANDROID® operating system, a Linux operating system, an IOS® operating system, or an OS X® operating system.

The operating system loader 310 may load libraries, application programs 320, and other data elements. The operating system loader 310 may be incorporated in the operating system.

The process virtual machine 315 may load data elements in an ANDROID® operating system environment. In one embodiment, the process virtual machine 315 is a Dalvik virtual machine provider. The Dalvik virtual machine provider may load ANDROID® applications.

The application program 320 may load libraries and other data elements. For example, the application program 320 may load one or more dynamic link libraries (DLL), application data, operating system interfaces, and the like.

Figure 4:
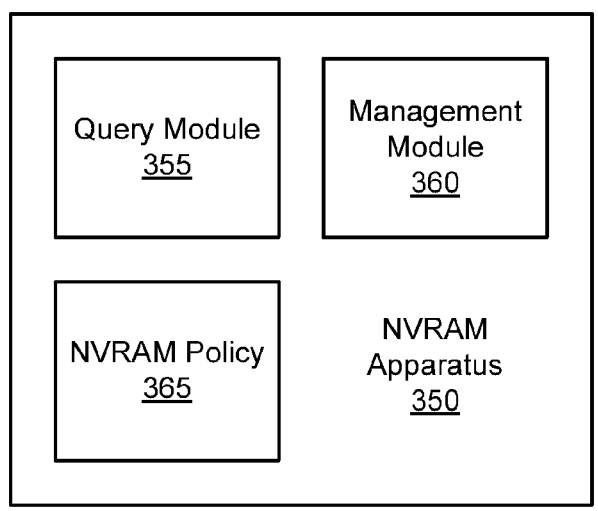
FIG. 4 is a schematic block diagram illustrating one embodiment of an NVRAM apparatus.

FIG. 4 is a schematic block diagram illustrating one embodiment of an NVRAM apparatus 350. The NVRAM apparatus 350 may be embodied in the computing device 100. The NVRAM apparatus 350 may include a query module 355, a management module 360, and an NVRAM policy 365. In a certain embodiment, the query module 355, the management module 360, and the NVRAM policy 365 are embodied in a computer readable storage medium such as the random-access memory 135 and/or the storage device 125. The computer readable storage media may store code that when executed by the processor 105 performs the functions of the query module 355, the management module 360, and the NVRAM policy 365.

The query module 355 may identify persistent data on NVRAM 115 in response to waking the NVRAM 115. The management module 360 may make available the persistent data for use as will be described hereafter. In one embodiment, the NVRAM policy 365 determines when a first data element should be migrated from the DRAM 130 to the NVRAM 115.

Figure 5:
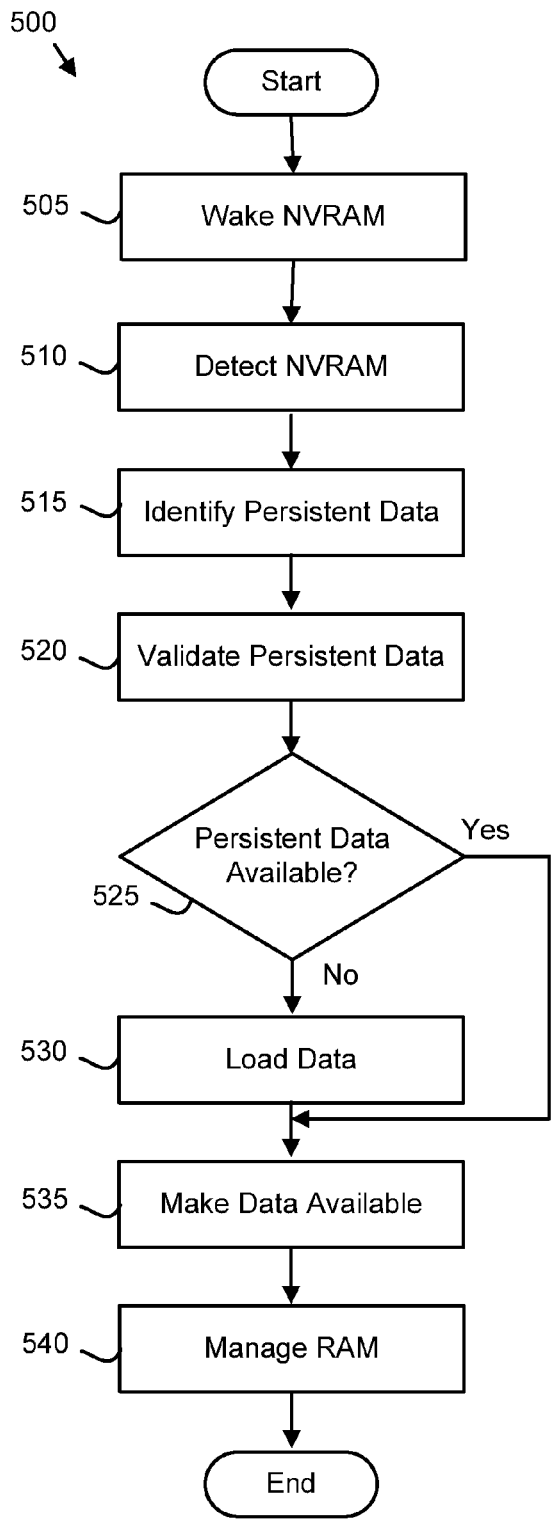
FIG. 5 is a schematic flow chart diagram illustrating one embodiment of an NVRAM use method.

FIG. 5 is a schematic flow chart diagram illustrating one embodiment of an NVRAM use method 500. The method 500 may perform the functions of the computing device 100 and the apparatus 350. In one embodiment, the method 500 is performed by use of the processor 105. Alternatively, the method 500 may be embodied in a computer readable storage medium such as the random-access memory 135 and/or the storage device 125. The computer readable storage media may store code that when executed by the processor 105 performs the functions of the method 500.

The method 500 starts, and in one embodiment, the NVRAM 115 wakes 505. The NVRAM 115 may wake in response to the computing device 100 booting. In one embodiment, the computing device 100 boots in response to powering on. Alternatively, the computing device 100 may boot in response to restarting. Booting the computing device 100 may include a Power On Self Test (POST).

In one embodiment, the NVRAM 115 wakes 505 by transitioning from a powered off state to a powered on state. Alternatively, the NVRAM 115 may wake in response to a reset signal.

The query module 355 may detect 510 the NVRAM 115. In one embodiment, the query module 355 detects 510 the NVRAM 115 in response to waking 505 the NVRAM 115. In an alternative embodiment, the query module 355 detects 510 the NVRAM 115 in response to booting the computing device 100.

In one embodiment, the query module 355 detects 510 the NVRAM 115 by reading a register such as a register in the memory controller 120. Alternatively, the query module 355 may detect 510 the NVRAM 115 from a parameter in boot firmware.

The query module 355 does not change the data stored in the NVRAM 115 after detecting the NVRAM 115. In addition, other processes may also be restrained from changing the data stored in the NVRAM 115. For example, boot firmware may be restrained from altering the contents of the NVRAM 115 during a POST process.

In one embodiment, the query module 355 identifies 515 persistent data stored on the NVRAM 115. The query module 355 may identify 515 the persistent data on the NVRAM 115 in response to waking the NVRAM. Alternatively, the query module 355 may identify 515 the persistent data on the NVRAM 115 in response to booting the computing device 100.

As used herein, persistent data may refer to a data element that is stored on the NVRAM 115. In addition, the persistent data may be a data element that is stored on the NVRAM 115 and that is validated as usable by the computing device 100. In one embodiment, the query module 355 may examine the entries 220 in the catalog 200 to identify 515 the persistent data. For example, the query module 355 may read the data identifier 205 to identify 515 the persistent data.

In one embodiment, the query module 355 identifies 515 the persistent data in response to the data loading process 300 receiving a request to load the data element associated with persistent data. For example, if a boot loader 305 attempts to load an operating system kernel, the query module 355 may identify 515 persistent data for the operating system kernel in the NVRAM 115.

In addition, the query module 355 may validate 520 the persistent data. In one embodiment, the query module 355 compares the data element stored at the storage address 210 with the validation signature 255 for the data element. For example, the query module 355 may calculate a hash for the data element and compared the calculated hash with a hash stored in the validation signature 255. If the calculated hash and the stored hash are equivalent, the query module 355 may validate 520 the data element as persistent data.

The query module 355 may further determine 525 if the persistent data is available. The persistent data may be available if the current status 235 for the persistent data is "current." In one embodiment, the persistent data is available if the catalog 200 includes an entry 220 for the data element of the persistent data and if the data element of the persistent data is validated.

In one embodiment, the query module 355 determines 525 that a data element is not persistent data if the NVRAM 115 was modified subsequent to waking 505 the NVRAM 115. Alternatively, the query module 355 may determine 525 that the data element is not persistent data if any data was written to the storage address 210 of the data element subsequent to waking 505 the NVRAM 115 and before determining 525 that the data element is persistent data.

If the query module 355 determines 525 that the data element is not available as persistent data, a data loading process 300 may load the data element from the storage device 125 to the random-access memory 135. In addition, the management module 360 may make 535 the loaded data element available.

If the data element is available as persistent data, the management module 360 may make available 535 the persistent data. In one embodiment, the management module 360 makes available 535 the persistent data by updating the memory controller 120 to indicate the availability of the persistent data on the NVRAM 115. Alternatively, the management module 360 may update the file system to indicate the persistent data is available. The management module 360 may further manage 540 the random-access memory 135 and the method 500 ends.

Figure 6:
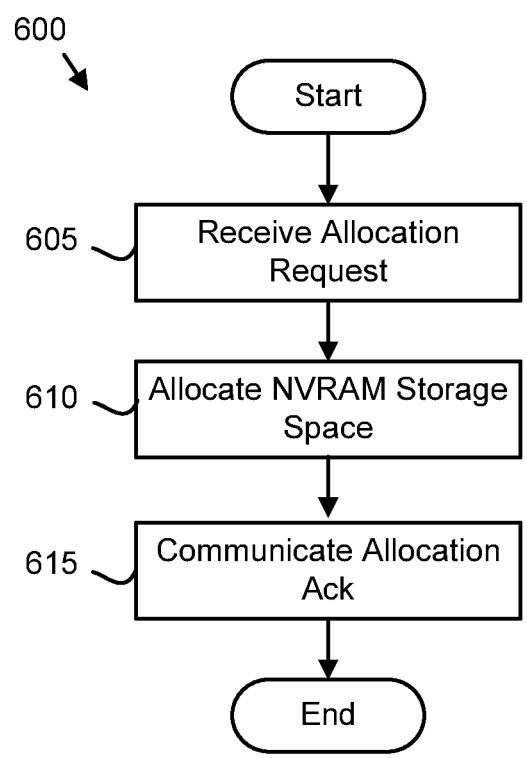
FIG. 6 is a schematic flow chart diagram illustrating one embodiment of an NVRAM allocation method.

FIG. 6 is a schematic flow chart diagram illustrating one embodiment of an NVRAM allocation method 600. The NVRAM allocation method 600 may be embodied in the random-access memory management step 540 described for FIG. 5. The method 600 may perform the functions of the computing device 100 and the apparatus 350. In one embodiment, the method 600 is performed by use of the processor 105. Alternatively, the method 600 may be embodied in a computer readable storage medium such as the random-access memory 135 and/or the storage device 125. The computer readable storage media may store code that when executed by the processor 105 performs the functions of the method 600.

The method 600 starts, and in one embodiment, the management module 360 receives 605 an allocation request for an allocation of storage space from the NVRAM 115. The allocation request may be from the boot loader 305, the operating system loader 310, the process virtual machine 315, the application program 320, or another data loading processes 300. The allocation request may specify a data element that will receive the allocation of NVRAM storage space. In one embodiment, the allocation request is embodied in an Application Program Interface (API).

The management module 360 may allocate 610 the NVRAM storage space. In one embodiment, the management module 360 allocates 610 the NVRAM storage space in response to the allocation request. In an alternative embodiment, the management module 360 allocates 610 the NVRAM storage space in response he allocation request and if the persistence settings 245 for the data element receiving the NVRAM storage space is ALWAYS STORE.

The management module 360 may also allocate 610 the NVRAM storage space in response to the allocation request, if the persistent settings 245 for the data element receiving the NVRAM storage space is SPACE AVAILABLE, and if free storage space is available on the NVRAM 115. Alternatively, the management module 360 may deny the allocation request if the persistence settings 245 for the data element receiving the NVRAM storage space is SPACE AVAILABLE and if free storage space is not available on the NVRAM 115.

In a certain embodiment, the management module 360 may also deny the allocation request if the persistence setting 245 for the data element receiving the NVRAM storage space is NOT NEEDED. In one embodiment, if the management module 360 denies he allocation request to allocate NVRAM storage space, the management module 360 may instead allocate DRAM storage space in response to the allocation request.

In one embodiment, the management module 360 communicates 615 an allocation acknowledgment in response to allocating 610 the NVRAM storage space and the method 600 ends. The allocation acknowledgment may indicate whether the NVRAM storage space was allocated, and if allocated, the address range of the NVRAM storage space. The management module 360 may communicate 615 the allocation acknowledgment to the data loading process 300 that requested the allocation. In addition, the memory management module 360 may communicate 615 the allocation acknowledgment to the memory controller 120.

Figure 7:
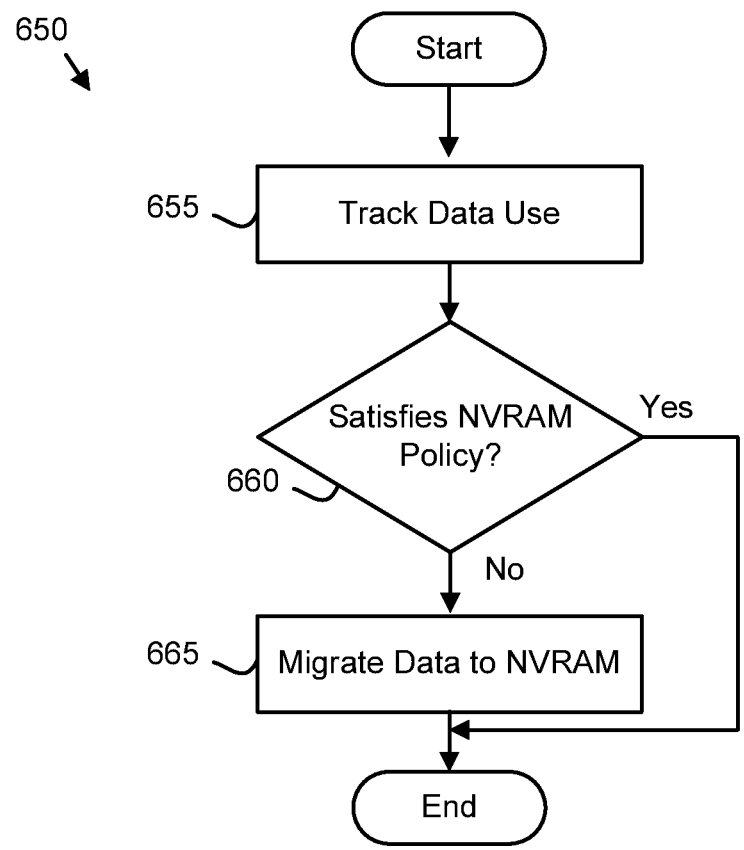
FIG. 7 is a schematic flowchart diagram illustrating one embodiment of an NVRAM migration method.

FIG. 7 is a schematic flowchart diagram illustrating one embodiment of an NVRAM migration method 650. The NVRAM migration method 650 may be embodied in the random-access memory management step 540 described for FIG. 5. The method 650 may perform the functions of the computing device 100 and the apparatus 350. In one embodiment, the method 650 is performed by use of the processor 105. Alternatively, the method 650 may be embodied in a computer readable storage medium such as the random-access memory 135 and/or the storage device 125. The computer readable storage media may store code that when executed by the processor 105 performs the functions of the method 650.

The method 650 starts, and in one embodiment, the management module 360 tracks 655 data use of a first data element on the DRAM 130. In one embodiment, the management module 360 increments the uses per interval 240 each time the data element is accessed during the specified use interval.

Alternatively, the management module 360 may record a first access to the first data element during the specified use interval in the uses per interval 240. In one embodiment, the management module 360 tracks 655 data use by recording a timestamp of a last access to the first data element in the last access 250.

The management module 360 may further determine 660 if the first data element satisfies the NVRAM policy 365. The first data element may satisfy the NVRAM policy 365 if data element uses per interval 240 exceed a use threshold. Alternatively, the first data element may satisfy the NVRAM policy 365 if the persistent settings 245 for the first data element include ALWAYS STORE.

In an alternative embodiment, the first data element may satisfy the NVRAM policy 365 if free storage space is available on the NVRAM 115 and the persistence settings 245 for the first data element include SPACE AVAILABLE. In one embodiment, the first data element satisfies the NVRAM policy 365 if the last use 250 is within a last use threshold.

If the first data element does not satisfy the NVRAM policy 365, the method 650 ends. If the first data element satisfies the NVRAM policy 365, the management module 360 may migrate 665 the first data element to the NVRAM 115 by copying the first data element to the NVRAM 115, updating the catalog 200 to include an entry 220 for the first data element, and deleting the first data element from the DRAM 130.

The embodiments allow persistent data stored in the NVRAM 115 to be used after the NVRAM 115 is awoken without reloading the persistent data. As a result, the computing device 100 is available to perform functions more rapidly. The embodiments further manage the NVRAM 115 by allocating NVRAM storage space. In addition, the embodiments may migrate data elements to the NVRAM 115 that satisfy the NVRAM policy 365, thus allowing those data elements to be persistent data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor, the code comprising:
   a query module that receives a request to load a data element in response to waking a nonvolatile random access memory (NVRAM) and in response to the request identifies persistent data comprising the data element on the NVRAM from a catalog stored on the NVRAM; and
   a management module that makes available the persistent data for use without loading the data element in response to validating the persistent data with a validation signature stored in the catalog.

2. The apparatus of claim 1, wherein the query module further:
   detects the NVRAM.

3. The apparatus of claim 2, wherein the catalog records a data identifier and a storage address of the persistent data.

4. The apparatus of claim 3, wherein the persistent data is validated using a data pedigree stored in the catalog and the data pedigree comprises the validation signature.

5. The apparatus of claim 1, wherein the management module further:
   receives an allocation request for an allocation of NVRAM storage space;
   allocates the NVRAM storage space; and
   communicates an allocation acknowledgement comprising an allocated block address for the NVRAM memory.

6. The apparatus of claim 1, wherein the management module further:
   tracks data use of a first data element stored on a dynamic random-access memory (DRAM);
   determines the first data element satisfies a NVRAM policy; and
   migrates the first data element to the NVRAM in response to a NVRAM policy.

7. A method comprising:
   receiving, by use of a processor, a request to load a data element in response to waking a nonvolatile random access memory (NVRAM);
   in response to the request, identifying persistent data comprising the data element on the NVRAM from a catalog stored on the NVRAM; and
   making available the persistent data for use without loading the data element in response to validating the persistent data with a validation signature stored in the catalog.

8. The method of claim 7, the method further comprising:
   validating the persistent data.

9. The method of claim 8, wherein the catalog records a data identifier and a storage address of the persistent data.

10. The method of claim 9, wherein the persistent data is validated using a data pedigree stored in the catalog and the data pedigree comprises the validation signature.

11. The method of claim 7, the method further comprising:
    receiving an allocation request for an allocation of NVRAM storage space;
    allocating the NVRAM storage space; and
    communicating an allocation acknowledgement comprising an allocated block address for the NVRAM memory.

12. The method of claim 7, the method further comprising:
    tracking data use of a first data element stored on a dynamic random-access memory (DRAM);
    determining the first data element satisfies a NVRAM policy; and
    migrating the first data element to the NVRAM in response to a NVRAM policy.

13. The method of claim 12, wherein the NVRAM policy tests one or more of first data element uses per interval, persistence settings, and a last use.

14. The method of claim 7, wherein one or more of a boot loader, an operating system loader, a process virtual machine, and an application identifies the persistent data and makes the persistent data available.

15. The method of claim 7, wherein the persistent data is one or more of a software application and application data.

16. A program product comprising a computer readable storage medium storing code executable by a processor to perform:
    receiving a request to load a data element in response to waking a nonvolatile random access memory (NVRAM);
    in response to the request, identifying persistent data comprising the data element on the NVRAM from a catalog stored on the NVRAM; and
    making available the persistent data for use without loading the data element in response to validating the persistent data with a validation signature stored in the catalog.

17. The program product of claim 16, the code further:
    validating the persistent data.

18. The program product of claim 17, wherein the catalog records a data identifier and a storage address of the persistent data.

19. The program product of claim 18, wherein the persistent data is validated using a data pedigree stored in the catalog and the data pedigree comprises the validation signature.

20. The program product of claim 17, the code further:
    receiving an allocation request for an allocation of NVRAM storage space;
    allocating the NVRAM storage space; and
    communicating an allocation acknowledgement comprising an allocated block address for the NVRAM memory.

* * * * *